US009219509B1

(12) United States Patent
Ware

(10) Patent No.: US 9,219,509 B1
(45) Date of Patent: Dec. 22, 2015

(54) SYSTEM PERFORMANCE IMPROVEMENT USING DATA REORDERING AND/OR INVERSION

(71) Applicant: Rambus Inc., Sunnyvale, CA (US)

(72) Inventor: Frederick A. Ware, Los Altos Hills, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 13/963,321

(22) Filed: Aug. 9, 2013

Related U.S. Application Data

(60) Provisional application No. 61/682,035, filed on Aug. 10, 2012.

(51) Int. Cl.
*H04L 25/00* (2006.01)
*H04B 1/10* (2006.01)
*H04B 1/04* (2006.01)
*H04L 12/70* (2013.01)
*G06F 13/42* (2006.01)
*H04L 12/935* (2013.01)
*G06F 7/76* (2006.01)
*G06F 12/06* (2006.01)

(52) U.S. Cl.
CPC ............... *H04B 1/10* (2013.01); *H04B 1/0475* (2013.01); *G06F 7/76* (2013.01); *G06F 12/0607* (2013.01); *G06F 13/4204* (2013.01); *G09G 2360/123* (2013.01); *H04L 49/3018* (2013.01); *H04L 2012/5679* (2013.01)

(58) Field of Classification Search
CPC . G06F 12/1408; G06F 21/72; G06F 13/4204; G06F 12/0607; G06F 7/76; H04L 1/0041; H04L 1/08; H04L 1/0071; H04L 49/3018; H04L 2012/5679; Y02B 60/44; G09G 2360/123
USPC .................................. 375/259; 711/127, 157
See application file for complete search history.

(56) References Cited

U.S. PATENT DOCUMENTS

| 7,411,840 | B2 | 8/2008 | Gaskins et al. |
| 7,929,549 | B1 | 4/2011 | Talbot |
| 8,451,918 | B1 * | 5/2013 | Cheng et al. ................... 375/260 |
| 2003/0125015 | A1 * | 7/2003 | Inoue et al. .................... 455/411 |
| 2005/0002324 | A1 * | 1/2005 | Sutivong et al. .............. 370/208 |
| 2006/0018297 | A1 * | 1/2006 | Gorokhov ...................... 370/343 |
| 2008/0048730 | A1 | 2/2008 | Bae |
| 2008/0180288 | A1 * | 7/2008 | Lee ............................... 341/100 |

(Continued)

OTHER PUBLICATIONS

Bae et al., "An 80 nm 4 Gb/s/pin 32 bit 512 Mb GDDR4 Graphics DRAM With Low Power and Low Noise Data Bus Inversion," IEEE Journal of Solid-State Circuits, vol. 43, No. 1, Jan. 2008. 11 pages.
Hollis, Timothy M., "Data Bus Inversion in High-Speed Memory Applications," IEEE Transactions on Circuits and Systems-II: Express Briefs, vol. 56, No. 4, Apr. 2009. 5 pages.

*Primary Examiner* — Leila Malek
(74) *Attorney, Agent, or Firm* — Fenwick & West LLP

(57) ABSTRACT

A system and method for reordering transmitted bits to minimize the number of bit transitions per bit time, reducing system power consumption and signaling noise. Bit reordering is accomplished by performing skip operations, where to-be-transmitted bits are replaced by one or more bits in the bit stream at given bit times. DBI may be used in addition, or as an alternative, to bit reordering to further minimize the number of bit transitions per bit time. A receiver performs operations necessary to restore bits to their original sequence and/or recover the bits in their non-inverted form.

34 Claims, 8 Drawing Sheets

(56) References Cited

U.S. PATENT DOCUMENTS

| | | |
|---|---|---|
| 2008/0225603 A1 | 9/2008 | Hein |
| 2009/0052582 A1* | 2/2009 | Oren ............................. 375/319 |
| 2009/0147882 A1* | 6/2009 | Rha ............................... 375/295 |
| 2009/0238300 A1 | 9/2009 | Hollis |
| 2009/0276671 A1* | 11/2009 | Fang et al. ..................... 714/748 |
| 2010/0005351 A1* | 1/2010 | Ahn et al. ...................... 714/748 |
| 2011/0127990 A1 | 6/2011 | Wilson et al. |

\* cited by examiner

SYSTEM PERFORMANCE IMPROVEMENT USING DATA REORDERING AND/OR INVERSION

CROSS-REFERENCE TO RELATED APPLICATIONS

This application claims priority to U.S. Provisional Patent Application No. 61/682,035, entitled "SYSTEM PERFORMANCE IMPROVEMENT USING DATA REORDERING AND/OR INVERSION," filed Aug. 10, 2012, and is related to U.S. Provisional Patent Application No. 61/643,123, filed May 4, 2012 and entitled, "SIGNAL OUTPUT IMPROVEMENT USING DATA INVERSION AND/OR SWAPPING," the disclosures of which are incorporated herein by reference.

BACKGROUND

In data communication systems, data is often transmitted as binary information in the form of bits, where a relatively high voltage represents a bit having a logic value 1 and a relatively low voltage represents a bit having a logic value 0 (or vice versa). To increase throughput, multiple bits may be transmitted in parallel over one or more data buses or channels, each channel having several sub-channels. For example, a data channel may include eight sub-channels to transmit eight bits during a given bit time.

In AC-signaling systems, the number of sub-channel bit transitions, i.e., where some sub-channel bits transition at the start of a new bit time between high and low voltages on a given channel, is directly proportional to the amount of supply current drawn by that channel. As such, signal streams with a smaller average number of bit transitions per bit time draw lower supply current, and signal streams with a larger average number of bit transitions per bit time draw higher supply current. Current fluctuations due to variations in bit patterns may cause noise within the system and are somewhat mitigated using data bus inversion (DBI), where an inverse operation is conditionally applied to the bits on a data channel to reduce the average number of bit transitions per bit time as well as the range of the number of bit transitions per bit time.

BRIEF DESCRIPTION OF THE DRAWINGS

For a more complete understanding of the concepts described herein, reference is now made to the following descriptions taken in conjunction with the accompanying drawings, in which.

DETAILED DESCRIPTION OF THE INVENTION

Systems described herein modify the order in which data symbols such as multi-bit words or bytes are transmitted in a way to reduce the number of bit transitions per bit time. Doing so reduces system power consumption and signaling noise. Reordering is accomplished by performing skip operations, where to-be-transmitted bits comprising a symbol are replaced by one or more bits comprising other data symbols in the data stream at given bit times. DBI may be used in addition, or as an alternative, to bit reordering to further minimize the number of bit transitions per bit time. A receiver performs operations necessary to restore symbols to their original sequence and/or recover the symbols in their non-inverted form.

Figure 1:
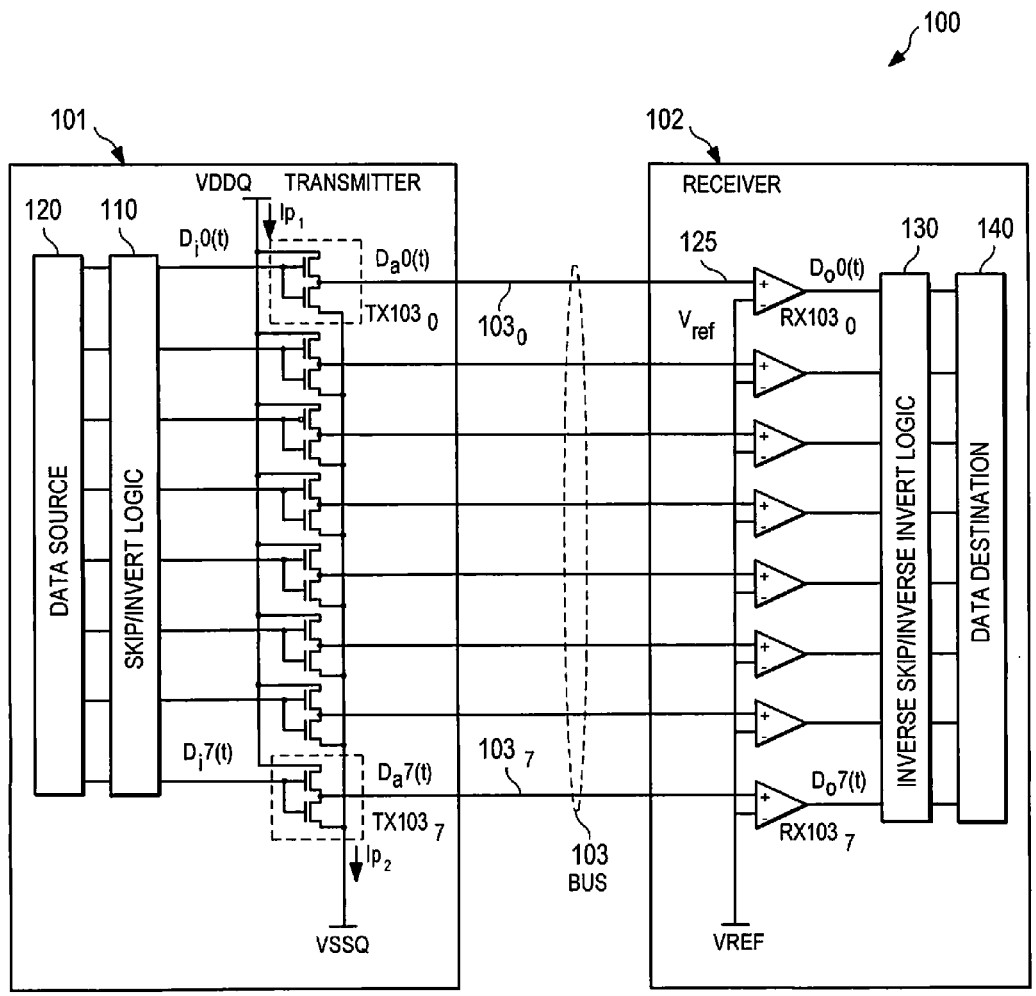
FIG. 1 illustrates an embodiment of a communication system in which concepts described herein are applied.

FIG. 1 illustrates an AC-signaling communication system 100 including a transmitter 101 and a receiver 102. Transmitter 101 may, for example, be located in a memory device, memory controller, buffer circuit, or other part of a memory system or other bused system that conveys data, addresses, and/or commands and includes or is in communication with one or more data sources 120. Data source 120 may provide parallel data streams $D_i0(t)$-$D_i7(t)$ (shown in FIG. 1 after operation of a skip/invert logic block 110), and may include, e.g., a serial-to-parallel converter, multiplexing logic, and the like. Receiver 102 may also be located in similar devices as those identified above for the transmitter, but the transaction described is the target of the transmitter and is thus in a peered device. Receiver 102 recovers output data $D_o0(t)$-$D_o7(t)$ and may include or be in communication with data destination 140. Data destination 140 may include demultiplexing logic and other necessary logic to recover and use the data. As will be discussed in greater detail, transmitter 101 includes or is in communication with skip/invert logic 110 and receiver 102 includes or is in communication with inverse skip/inverse invert logic 130.

Transmitter 101 includes a group of transmitters $TX103_0$-$TX103_7$ coupled between a voltage node supplying a high voltage, VDDQ, and a voltage node supplying a low voltage, VSSQ. Transmitters 101 convey eight discrete signals, bit streams $D_i0(t)$-$D_i7(t)$, as parallel, continuous-time signals $D_a0(t)$-$D_a7(t)$, to receiver 102 via eight bit lane sub-channels $103_0$-$103_7$. Together, sub-channels $103_0$-$103_7$ comprise a parallel data channel or bus 103. Eight sub-channels are shown connected between transmitter 101 and receiver 102; however, it should be appreciated that system 100 may support more or fewer sub-channels and/or channels according to other embodiments.

Transmitters $TX103_0$-$TX103_7$ may comprise transistors that, according to some configurations, are driven by pre-drivers (not shown) according to received enable signals and may be off (non-conducting) or on (conducting) in response to the state of a respective one of signals $D_i[0:7](t)$. In at least one embodiment, transmitters $TX103_0$-$TX103_7$ may be implemented using PMOS transistors through which current passes when their respective control terminals are presented with relatively low voltages, or may be implemented using NMOS transistors through which current passes when their respective control terminals are presented with relatively high voltages.

According to the illustrated embodiment, each transmitter $TX103_0$-$TX103_7$ includes a pull-up driver and a pull-down driver that transfer the data streams onto each respective sub-channel according to signals received from data source 120. Specifically, transmitters $TX103_0$-$TX103_7$ each include a pull-up driver having a control terminal receiving a data signal stream from data source 120, a first current-handling terminal coupled to a high voltage node VDDQ, and a second current-handling terminal providing a version of the signal stream as a continuous-time output signal. Each pull-down driver also includes a control terminal receiving a data signal stream from data source 120, a first current-handling terminal coupled to a low voltage node VSSQ, and a second current-handling terminal coupled to second current-handling terminal of the corresponding pull-up driver.

For each sub-channel, the pull-up driver may be used to drive a logic 1 over the sub-channel when driven and the pull-down driver may be used to drive a logic 0 over the same link when driven. Pull up currents $I_p$ 1 (on selected sub-channels of bus 103) flow toward receiver 102 to charge the respective bit lanes and signal a logic 1 on the desired sub-channels. Pull down currents $I_p2$ (on selected sub-channels of bus 103) flow away from receiver 102 to discharge the respective bit lanes and signal a logic 0 on the desired sub-channels. Each transmit amplifier is assumed to draw approximately the same maximum current, I. Therefore, the magnitude of current $I_p$ 1 peaks at 8I when all pull-up drivers are on, and the magnitude of currents $I_p2$ peaks at 8I when all pull-down drivers are on.

Receiver 102 comprises eight receive amplifiers $RX103_0$-$RX103_7$ connected to respective sub-channels $103_0$-$103_7$, where each receiver amplifier includes a data node and a reference node. Each data node is coupled to a respective data terminal 125 for receiving data over its respective sub-channel, and a reference node. Each reference node is coupled to a reference voltage node, VREF, which has a value approximately midway between VDDQ and VSSQ.

Signal reflections on the sub-channels may limit system performance. To limit signal reflections, source-side or transmit-side termination may be implemented in single-ended, AC-driven systems by matching the transmitter impedance to the characteristic impedance of the sub-channel itself. In this example, the sub-channel is not terminated (or is significantly unmatched) at the receiver. Signal reflections from the respective receiver on each sub-channel will be dampened upon return to the originating transmitter. As such, system 100 is preferably configured according to a source-termination scheme for each sub-channel to reduce signal reflections on the sub-channels.

The system illustrated in FIG. 1 utilizes a single group of transmitters operating in full swing mode such that all transmitters in the system use the entire voltage range, i.e., between VDDQ and VSSQ. However, according to another embodiment, system 100 could be implemented as a stacked, single-ended system operating in half-swing mode. According to such an embodiment, system 100 may comprise a first group of transmitters using one half of the available voltage range (between VDDQ and VSSQ) to transmit data on first group of sub-channels, i.e., the voltage range between VDDQ and a midpoint voltage, VMID, and second group of transmitters using the other half of the available voltage range to transmit data on a second group of sub-channels, i.e., the voltage range between VMID and VSSQ. In such an embodiment, VMID is a single intermediate voltage supply shared across all transmitters. In half-swing mode, the voltage signal is one-half the magnitude of the same symbol transition in full swing mode. Therefore, the voltage swing on each data channel and the points at which a bit on each channel transitions between binary states are separated by half as much voltage, which reduces power consumed by the system.

As discussed, transmitter 101 conveys data to receiver 102 on each bit lane as bit patterns, each expressed as a voltage signal that transitions (as required by the data) between relatively high and relatively low voltage levels between a first bit time and a second bit time. Receiver 102 recovers the bit patterns, and therefore the original data, by comparing the voltage signals on each channel near the center of each bit time against a reference voltage to distinguish between the high and low voltage levels during each bit time. Adjacent like-symbols are represented by maintaining the same voltage over multiple bit times, whereas adjacent dissimilar symbols are represented by transitioning between voltage levels between bit times. Transmitter 101 draws current from a voltage source, e.g., VDDQ, to express voltage levels and to transition between them. In communication system 100, which expresses data as source-terminated signals, most supply current is drawn during the bit transitions. As such, bit patterns with fewer bit transitions tend to draw lower supply current and bit patterns with more bit transitions tend to draw higher supply current. Therefore, supply current over time varies with the transmitted bit pattern, and more specifically with the number of transitions in that pattern being communicated.

It is generally understood that fluctuations in supply current tend to induce simultaneous switching noise, or SSN. This is particularly problematic where simultaneously transmitting and recovering multiple bits, e.g., where bits comprising symbols are transmitted in parallel, and can cause supply current needs to vary dramatically between bit times. In the case of system 100, in data channel 103, from zero to eight bits might change values from one bit time to the next. Such instability may introduce significant errors in supply and reference voltages, and thus adversely impact performance.

With the above in mind, systems described herein minimize the number of bit transitions per bit time, and therefore, the current fluctuations and their deleterious effects, by reordering the sequence in which bits are transmitted. This may be accomplished by performing one or more skip operations on to-be-transmitted bits, where bits sequenced for transmission at later bit times are transmitted in place of bits sequenced for transmission at an earlier bit time. That is, the bits sequenced for later transmission "skip" bits sequenced for earlier transmission in the transmitted data stream.

DBI may be used in conjunction with, or as an alternative to, the skip operations for a particular sequence to further minimize the number of bit transitions per bit time in the data stream. The DBI coding scheme reduces the total current drawn from the power supply for what would otherwise be power-intensive bit times. Assume, for example, an eight-bit channel that draws current from a supply node when a bit transitions from a 0 to 1 or vice versa. The worst-case current in such an instance would occur when all eight bits transition during one bit time. When the sum of bit transitions for a next bit time are determined to exceed 4, the ninth DBI bit inverts the bit on each sub-channel for the next bit time and signals the inversion on the ninth sub-channel. Using DBI, a ninth sub-channel may be used to signal an inversion of the bits for each byte that has more transitions than four. For example, the transition pattern 11111000-0 (the last bit is the DBI bit) becomes 00000111-1. This method guarantees that no more than four transitions will appear on the nine sub-channels at the start of each bit time.

The inversion and skip operations may be implemented by including additional bit lanes that dictate the state of the inversion and skip operations. In the example above, a ninth bit lane may be added on the data channel that defines when inversion applies, e.g., where a bit transition on the ninth bit lane signifies an inversion operation occurring on the channel. Additionally, a tenth bit lane may be added on the channel that defines when a skip operation applies, e.g., where a bit transition signal on the tenth bit lane signifies a skip operation occurring on the channel. These additional "inversion" and "skip" bits may also be transmitted on separate sub-channels, apart from the data channels themselves, between transmitter and receiver, or all at once in an additional bit time on the bus at the end of the sequence.

In some embodiments, consideration may be given to the effect of changing the skip and inversion bits between bit times. That is, maintaining the skip and inversion bits in the same binary state between bit times would reduce the number of bit transitions on each channel and the system overall. With this in mind, second order optimization includes selectively choosing to perform the skip and/or inversion operations at a bit time i+1 based on the binary states of the skip and inversion bits themselves at bit time i.

Over time, selectively utilizing skip and/or inversion operations as described above may be expected to reduce the number of bit transitions for the communication system, as compared to non-skip and/or non-inversion communication systems. By analyzing data collected according to the concepts described herein, it is found that when selectively applying skip and/or inversion operations as described herein, the expected average bit transition count decreases, even after accounting for transitions on the skip and inversion bit lanes.

Figure 2:
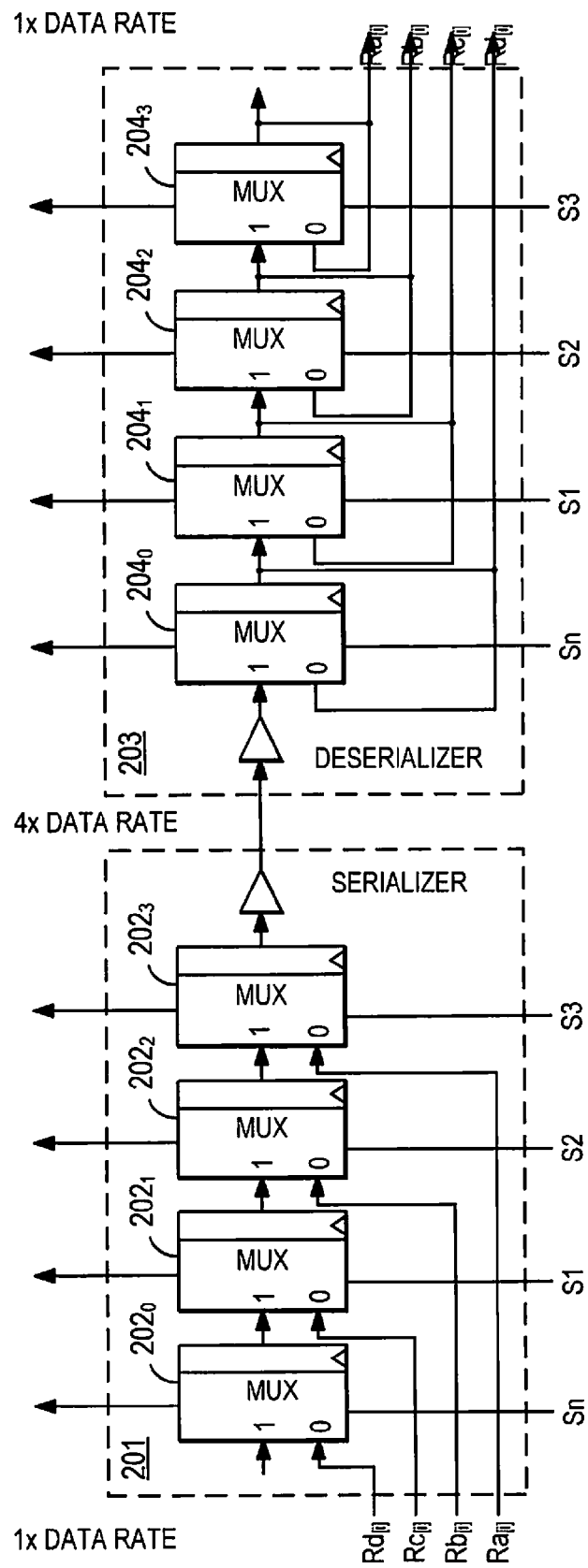
FIG. 2 illustrates components of a serializer/deserializer according to an embodiment.

To implement the concepts described herein, data symbols such as 8-bit digital words or bytes are serially transmitted from a transmitter (such as, e.g., transmitter 101 illustrated in FIG. 1) to a receiver (such as, e.g., receiver 102 as illustrated in FIG. 1). Embodiments described herein may implement serializer/deserializer logic at a transmitter and receiver, respectively, to enable skip and/or inversion operations, and their effective inverse operations. Serializer 201 and deserializer 203 enable conversion of data between the parallel and serial domains as that data is communicated from a transmitter to a receiver, and may be implemented on each of a respective sub-channel (such as, e.g., sub-channels $103_0$-$103_7$ illustrated at FIG. 1). Specifically, serializer 201 may be implemented on each sub-channel $103_0$-$103_7$ at transmitter 101 and deserializer 203 may be implemented on each sub-channel $103_0$-$103_7$ at receiver 102. FIG. 2 illustrates an example where four data symbols are serially transmitted on each sub-channel per column access. However, other implementations may extend to cases of more or fewer symbols.

Serializer logic 201 operates to convert a signal of relatively wide bit-width to a signal of one bit-width. According to the illustrated embodiment, serializer logic 201 comprises 4 MUXs $202_0$-$202_3$ that each include 0 and 1 input lines for receiving data, a select line for receiving a select control signal, and an output line. Each of MUXs $202_0$-$202_3$ present one of their input lines to their output line in accordance with the particular state of the select control signal. For a 2-input multiplexer, the select line may receive a binary logic signal for coupling each of the input lines to the output line. Serializer logic 201 operates to receive data in the parallel domain (from, e.g., $Ra_i$, $Rb_i$, $Rc_i$, and $Rd_i$) and serially shift the data on a single bit lane. Data may be shifted out in serial form by asserting a logic value 1 on a select line input to each MUXs $202_0$-$202_3$. In this way, serializer 202 operates similar to a parallel-in-serial-out (PISO) shift register.

Deserializer 203 is an example of logic that converts received data from the serial data domain to the parallel domain. Deserializer 203 comprises demultiplexing logic $204_0$-$204_3$ that each include 0 and 1 input lines for receiving data, a select line for receiving a select control signal, and an output line. At deserializer 203, a logic value 1 asserted on select lines to MUXs $204_0$-$204_3$ shifts bits thru the receiver logic. A logic value 0 asserted on select lines to MUXs $204_0$-$204_3$ outputs data in the parallel domain (to, e.g., $Ra_i$, $Rb_i$, $Rc_i$, and $Rd_i$).

According to the illustrated embodiment, parallel data is input to serializer logic 201 at a rate of 1/(column cycle time, tCC), which may be on the order of 5 nanoseconds or 200 MHz. That is, every 5 nanoseconds parallel data is input to serializer 201. However, data is serially transmitted at a faster rate. In the illustrated embodiment, where four symbols are serially transmitted per cycle, the rate increases by a magnitude of four (i.e., 4×1/tCC), or a rate of 800 MHz. Together, serializer 201 and deserializer 203 provide a logic combination facilitating the change in data rate between the relatively slow parallel domain and the relatively fast serial domain. As a result, speed is not sacrificed by serializing data.

In normal serialize/deserialize operation, data symbols are serially transmitted according to an expected or previously agreed upon data sequence such that a receiver can accurately restore the transmitted data symbols. However, transmitter logic described herein reorders serialized data by creating a new sequence so that bit transitions are minimized. Accordingly, receiver logic described herein performs operations to reconcile the reordered data and restore the received data to its original sequence. As such, according to one embodiment, serializer 201 operates with skip/invert logic 110 and provides serial data thereto (whether collocated with logic 110 or not) and deserializer 203 operates with inverse skip/inverse invert logic 130 to restore data (whether collocated with logic 130 or not).

Figure 3:
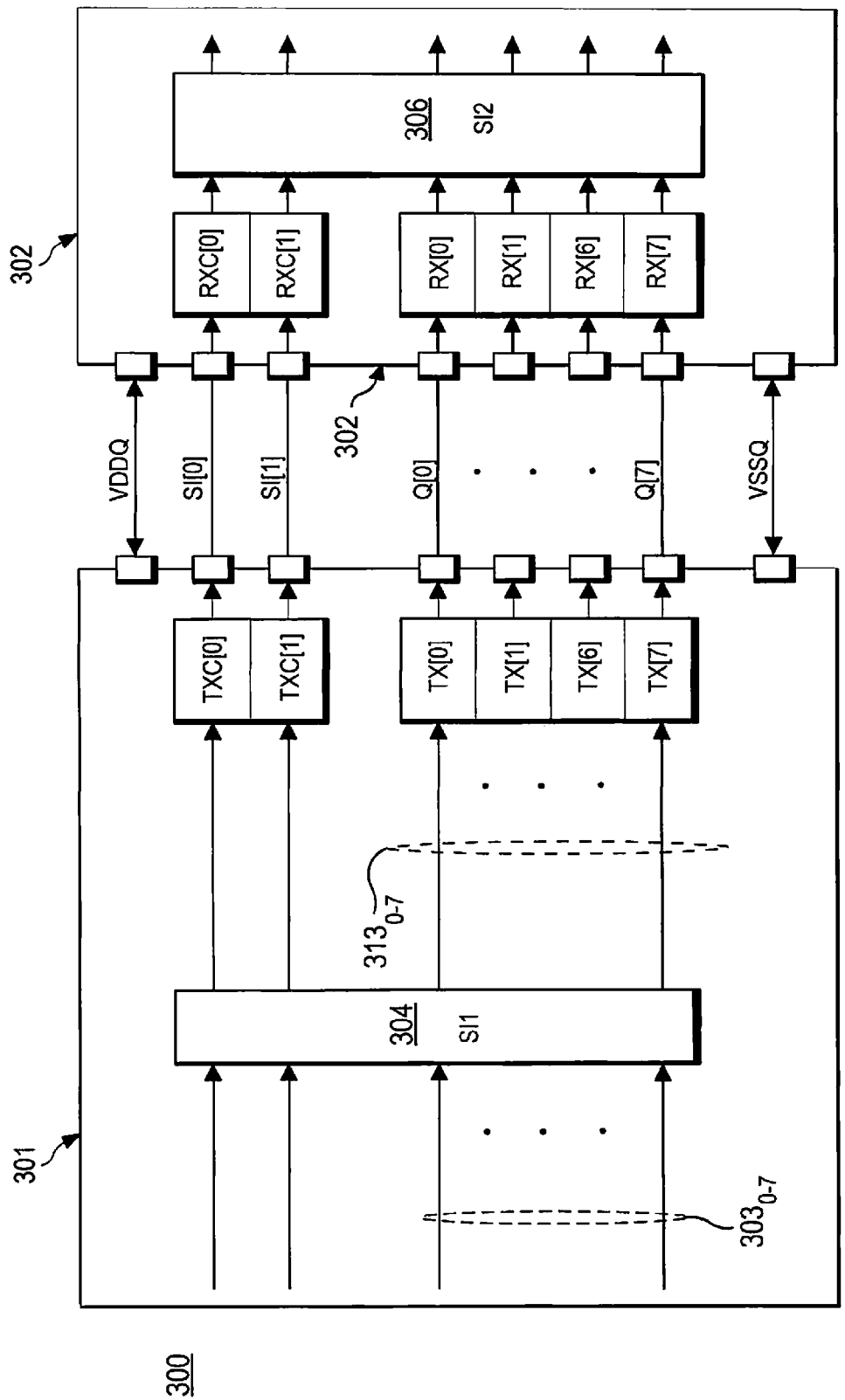
FIG. 3 illustrates an embodiment of a communication system in which concepts described herein are applied.

FIG. 3 illustrates system components in more detail that may be implemented in systems such as those illustrated in FIG. 1 to enable skip operations and/or inversion operations to reduce the number of bit transitions per bit time. Doing so improves system performance by reducing power consumption and reducing or shaping noise. Similar to the discussion related to FIG. 1, a transmitter 301 encodes bit streams from a data channel 303 and drives the encoded data to a receiver 302 via ten sub-channels Q[0.7] and SI[0.1]. Transmitters TX[0.7] and TXC[0.1], driving signals over Q[0.7] and SI[0.1], are coupled between a voltage node supplying a high voltage, VDDQ, and a voltage node supplying a low voltage, VSSQ.

Logic block 304 corresponds to skip/invert logic 110 illustrated at FIG. 1 and may comprise logic to perform multiplexing and switching functions and the like on data received from inputs coupled to data channel 303. Logic block 304 may also comprise logic to find the sum of bit transitions on data channel 303 between bit times, e.g. bit times i, i+1, i+2, and the like. Further, logic block 304 may comprise logic that facilitates skip and/or inversion operations to influence bit transitions based on the sum information.

Logic block 304 minimizes the number of bit transitions that occur on output data channel 313 by enabling the reordering of bits transmitted on data channel 313 and/or enabling the inversion of bits transmitted on data channel 313 over bit times. These functions are enabled by skip and inversion signals generated within logic block 304, which transmits data over each respective sub-channel according to the inversion and skip signals generated therein. As such, logic block 304 may transmit the skip and/or inversion signals directly to receiver 302, or instead, to other logic in transmitter 301 that utilize those signals before transmitting same to receiver 302. It should be appreciated that logic block 304 may choose to skip and/or invert bits over one or more bit times to provide a greater or smaller reduction in bit transitions, as needed to sufficiently minimize transitions. For some bit patterns, only one of the available operations may be needed to find an absolute minimum in transitions. For other bit patterns, it may be determined that both skip and inversion operations are needed to minimize bit transitions, irrespective of the order in which the operations are performed. For yet other bit patterns, it may be determined that applying a particular one of the available operations before the other is needed to minimize bit transitions. As mentioned, the decision to implement skip operations and/or inversion operations may be further influenced by the skip and inversion bits themselves. In any event, once the transmitted information is received at receiver 302, logic block 306 (which corresponds to inverse skip/inverse invert logic 130 illustrated at FIG. 1) performs inverse operations of the skip and/or inversion operations, as necessary, to recover the original data and send that data to its destination.

Figure 4:
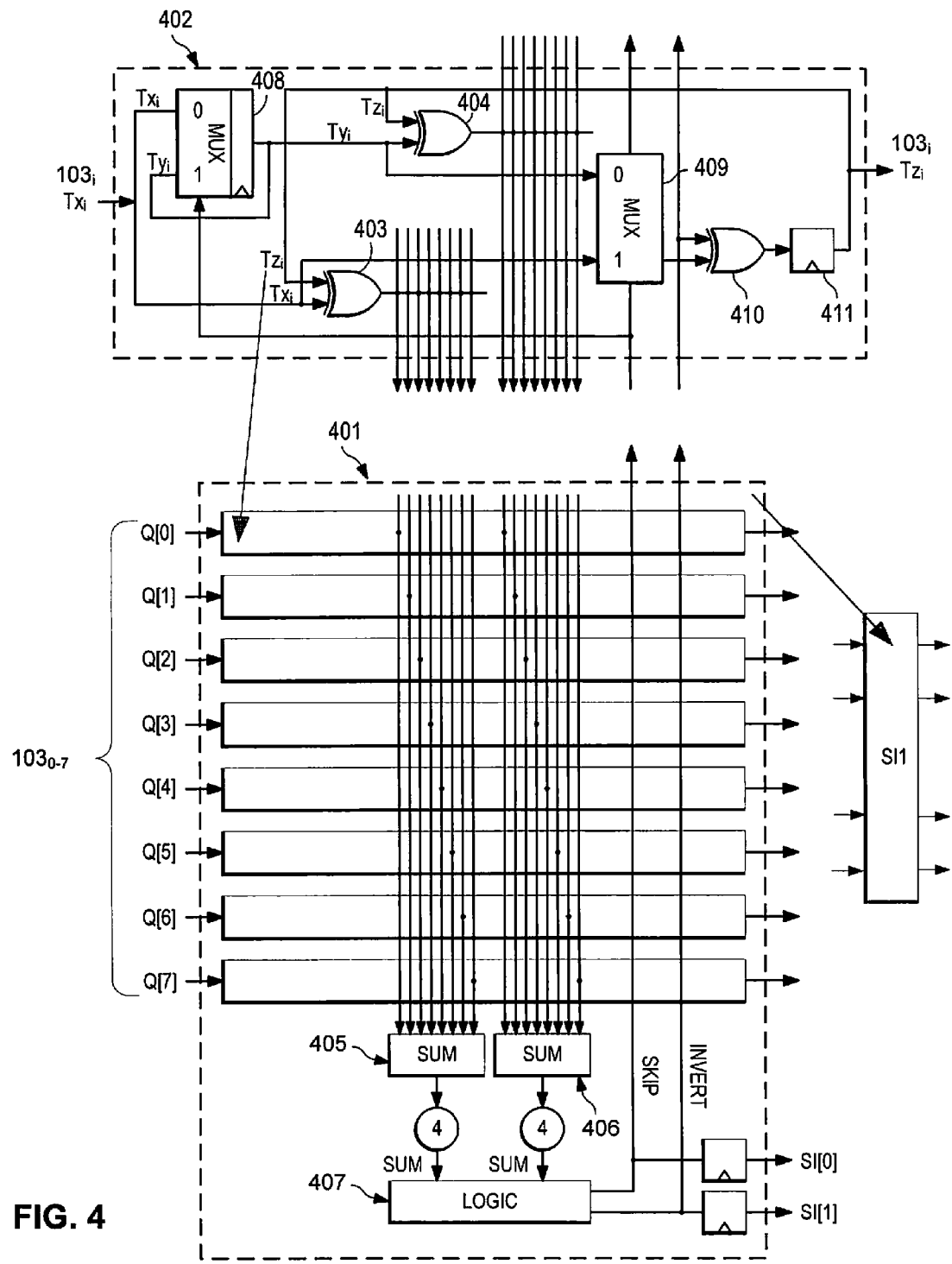
FIG. 4 illustrates components of a transmitter according to an embodiment.

FIG. 4 illustrates an embodiment of transmitter logic that may be implemented to transmit bit streams according to skip and/or inversion operations as described herein in systems such as those illustrated in FIGS. 1 and 3. Accordingly, FIG. 4 illustrates in greater detail an embodiment of logic corresponding to logic block 110 in FIG. 1 and logic block 304 in FIG. 3. A transmit logic block 400 includes a logic block 401, which itself includes multiple instances of a skip logic block 402. It will be understood by those in the art that functions performed by each block may be collocated in a single block, or separated in different blocks according to system parameters and the like. Each skip logic block 402 in skip/invert logic block 401 has inputs coupled to a respective sub-channel of data channel 103 (to receive bits over respective sub-channels $103_0$-$103_7$).

Referring to FIG. 4, bits are uniquely represented according to their progress within block 402 at different bit times, where $TX_i$ represents a bit received at block 402 at a current bit time, e.g., bit time i, $TY_i$ represents a bit previously received at block 402 at, e.g., bit time i−1, and $TZ_i$ represents a bit output from block 402 at the current bit time. Each skip block 402 compares the bit output from transmitter logic 400 at a current bit time ($TZ_i$) to both 1) the bit received by transmitter logic 400 at that current bit time ($TX_i$), and 2) a bit received by transmitter logic 400 at a previous bit time ($TY_i$). From those comparisons, transmitter logic 400 determines how, if at all, bits transmitted from logic 400 should be reordered to minimize bit transitions.

According to the embodiment illustrated at FIG. 4, the comparisons are performed by a series of XOR gates. First XOR gate 403 compares the bit output from skip block 402 at a current bit time, $TZ_i$, to the bit received at skip block 402 at the current bit time, $TX_i$. The comparison performed by first XOR gate 403 is provided to summing block 405, where a logic 0 is provided if the values of the two compared bits are the same and a logic 1 is provided if the values of the two compared bits are different. Second XOR gate 404 compares the bit output from skip block 402 the current bit time, $TZ_i$, to a bit received at skip block 402 at a previous bit time, $TY_i$. The comparison performed by second XOR gate 404 is provided to summing block 406, where a logic 0 is provided if the values of the two compared bits are the same and a logic 1 is provided if the values of the two compared bits are different.

Summing blocks 405 and 406 find first and second sums of bit transitions for the respective first and second comparisons of all skip blocks 402 resident in skip/invert logic block 401. Specifically, in this example, summing block 405 finds the total number of bit transitions between the $TZ_i$ bits and $TX_i$ bits; while summing block 406 finds the total number of bit transitions between the $TZ_i$ bits and $TY_i$ bits. Determining the minimum between blocks 405 and 406 produces two respective potential transition number indications—one, SUMZY, for transmitting the $TY_i$ bits during the bit time immediately following transmission of the $TZ_i$ bits, and the other, SUMZX, for transmitting the $TX_i$ bits during the bit time immediately following transmission of the $TZ_i$ bits (i.e., where the $TY_i$ bits have been skipped in favor of the $TX_i$ bits).

Logic block 407 receives the summed potential transition information and performs skip and/or inversion operations and multiplexing of the input channel onto the output channel to minimize the number of bit transitions between bit times i and i+1. That is, the summing information from logic blocks 405 and 406 is used by logic 407 to determine if 1) bits within the data stream on each sub-channel should be skipped, and/or 2) bits transmitted at bit time i+1 should be inverted to minimize the number of bit transitions. Signals from logic block 407 corresponding to skip and invert operations are asserted on respective SKIP and INVERT lines to the transmitter logic and on respective SI[0] and SI[1] lines to the receiver logic. That is, the SI[0] and SI[1] lines respectively serve to communicate an indication of reorder and inversion operations to the receiver across bit times.

Logic block 407 selects an order or sequence for to-be-transmitted data from logic blocks 405 and 406. If fewer bit transitions occur between the $TZ_i$ and $TX_i$ bits than between the $TZ_i$ bits and $TY_i$ bits, then logic block 407 asserts a signal on the SKIP line causing the $TX_i$ bits to-be-transmitted in place of the $TY_i$ bits at bit time i+1, even though the $TY_i$ bits were originally sequenced for transmission before the $TX_i$ bits. As will be described in further detail, the values asserted on the SKIP line determine how the bits are multiplexed by the transmitter logic. According to the illustrated embodiment, if logic block 407 asserts a logic value 1 on the SKIP line then the transmitter logic performs a skip operation; if logic block 407 asserts a logic value 0 on the SKIP line then the transmitter logic transmits the bits according to their temporal arrival at the transmitter logic.

Logic within each instance of block 402 operates to reorder to-be-transmitted data according to the signals asserted by logic block 407. First MUX 408 receives a $TY_i$ input (inputting a bit received at a previous bit time), a $TX_i$ input (inputting a bit received at a current bit time), and a SKIP line input from logic block 407. The value on the SKIP line causes first MUX 408 to select one of the two inputs to place at one input of second XOR gate 404 and second MUX 409. If the SKIP signal is a logic value 1, first MUX 408 provides the $TY_i$ bit as an input to second XOR gate 404 and second MUX 409 and circulates that $TY_i$ bit to its input for a subsequent comparison. In that scenario, the $TY_i$ bit remains within logic block 402 and second MUX 409 outputs the $TX_i$ bit for transmission effectively skipping the $TY_i$ bit for this bit time. On the other hand, if the SKIP signal is a logic value 0, first MUX 408 provides the $TX_i$ bit as an input to second XOR gate 404 and second MUX 409 and circulates that $TX_i$ bit for a subsequent comparison. In that scenario, the $TX_i$ bit is clocked through logic block 402 and second MUX 409 outputs the $TY_i$ bit for transmission next in the sequence.

Second MUX 409 receives the output from first MUX 408, a $TX_i$ input (inputting a bit received at the current bit time), and a SKIP input from logic block 407. The value on the SKIP line causes second MUX 409 to select one of the two inputs to place as an input to the third XOR gate 410. If the SKIP signal is a logic value 1, second MUX 409 provides the $TX_i$ bit as an input to the third XOR gate 410. In that scenario, the $TY_i$ bit remains within logic block 402 and second MUX 409 outputs the $TX_i$ bit for transmission effectively skipping the $TY_i$ bit for this bit time. If the SKIP signal is a logic value 0, second MUX 409 provides the bit received from first MUX 408 as an input to the third XOR gate 410. In that scenario, the $TX_i$ bit is clocked through logic block 402 and second MUX 409 outputs the $TY_i$ bit for transmission next in the sequence.

Logic block 407 may additionally perform inversion operations to further reduce the number of bit transitions per bit time. In doing so, logic block 407 may determine an optimal combination of skip and/or inversion operations to provide a minimum bit transitions number. According to the illustrated embodiment, if logic block 407 asserts a logic value 1 on the INVERT line then the transmitter logic performs an inversion operation; if logic block 407 asserts a logic value 0 on the INVERT line then the transmitter logic transmits the bits in their original form. According to the illustrated embodiment, a skip operation is performed, if at all, before an inversion operation. That is, a reordered bit may be presented as an input to third XOR gate 410, which may invert the reordered bit according to its INVERT line input from logic block 407. In this way, the inversion operation is optionally performed on bits by third XOR gate 410, whether reordered or not, as a second means for further reducing bit transitions, if possible.

Consider the example where logic block 407 receives sum information from blocks 405 and 406 and determines that the number of bit transitions between the $TZ_i$ and $TY_i$ bits is 7 and between the $TZ_i$ and $TX_i$ bits is 5 over given bit times. Logic block 407 asserts a logic 1 on the SKIP line, causing transmitter logic to place the $TX_i$ bits at the transmitter output instead of the $TY_i$ bits, reducing the number of bit transitions from 7 to 5. Further, logic block 407 determines that inverting the $TY_i$ bits further reduces the number of bit transitions from 5 to 3. Accordingly, logic block 407 also asserts a logic value 1 on the INVERT line causing transmitter logic to perform an inversion operation. The signals asserted on the SKIP and INVERT lines to the transmitter logic are also asserted on the SI[0] and SI[1] lines to the receiver logic, respectively. From this example, it is seen that the conjunctive application of skip and inversion operations reduces the number of bit transitions between given bit times from 7 to 3 over a given bit time.

The embodiment illustrated at FIG. 4 is constructed to provide a comparison of 1) bits comprising a byte output from the transmitter logic at a current bit time to bits comprising a byte received at that current bit time, and 2) bits comprising a byte output from the transmitter logic at the current bit time to bits comprising a byte received at a previous bit time. However, it should be appreciated that other embodiments may provide additional comparisons where, e.g., additional bytes sequenced for transmission at even later bit times (e.g., bit times i+2, i+3, i+4, i+5, . . . ) are considered in decisions to perform skipping and/or inversion operations. In such embodiments multiple comparisons, e.g., between the byte transmitted at bit time i to those sequenced for transmission at bit times i+1, i+2, i+3; between the byte sequenced for transmission at i+1 to those sequenced for transmission at i+2, i+3, i+4; and between the byte sequenced for transmission at i+2 to those sequenced for transmission at i+3, i+4, i+5 may be performed. Doing so may be more computationally intensive, but will also provide a broader picture of the sequenced bit stream, enabling the transmitter logic to perform skip and/or inversion operations with further reaching implications. According to such embodiments, bits comprising additional bytes would be clocked through the transmitter logic at multiple stages using multiple delay MUXs like MUX 408.

Figure 5:
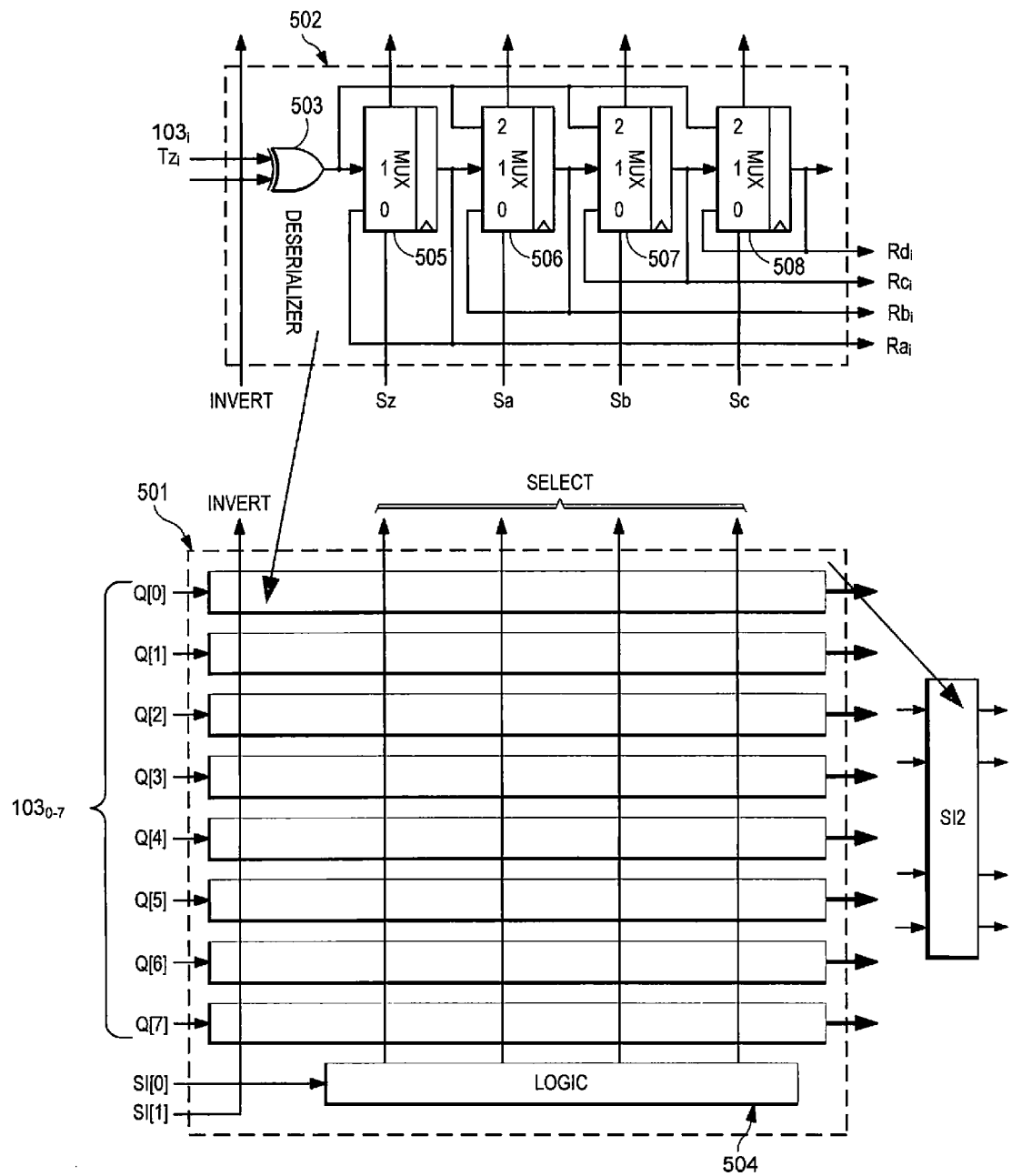
FIG. 5 illustrates components of a receiver according to an embodiment.

FIG. 5 illustrates an embodiment of receiver logic that may be implemented to receive and recover bit streams transmitted according to the skip and/or invert operations as described herein in systems such as those illustrated in FIGS. 1 and 3. Accordingly, FIG. 5 illustrates in greater detail an embodiment of logic corresponding to block 130 in FIG. 1 and block 306 in FIG. 3. Receiver logic 500 includes a logic block 501, which contains multiple instances of an inverse skip/inverse invert logic block 502. It will be understood by those in the art that functions performed by each block may be collocated in a single block, or separated in different blocks according to system parameters and the like. Logic block 501 has inputs coupled to sub-channels Q[0.7] and SI[0.1], where each inverse skip/inverse invert logic block 502 receives the invert signal, SI[1], indicating whether the bits received at a given bit time have been inverted, and a respective data sub-channel, Q[i]. Logic block 504 receives the skip signal, SI[0], indicating whether bits received at a given bit time have been reordered (i.e., whether a skip operation has been performed).

Each inverse skip/inverse invert logic block 502 receives serial data from transmitter block 400 on a respective sub-channel $103_i$ and assembles that data into words that are decoded to form the original data word. These words are represented by $Ra_i$, $Rb_i$, $Rc_i$, and $Rd_i$. First XOR gate 503 has one input for receiving a bit on a respective sub-channel 103, and another input for receiving a signal on SI[1] indicating whether the received bit has been inverted. When the received bit has been inverted (i.e., where a logic value 1 is asserted on SI[1]), first XOR gate 503 essentially performs a second invert operation to output the bit in its non-inverted form. Otherwise, when the received bit has not been inverted and a logic value 0 is asserted on SI[1], first XOR gate 503 does not perform an invert action to output the bit in its non-inverted form Logic block 504 has an SI[0] input indicating whether a skip operation has been performed on bits received at a given bit time. In response to signals asserted on the SI[0] input, logic block 504 asserts signals on select lines input to a series of MUXs 505-508, causing MUXs 505-508 to 1) shift bits through logic 500 in the order received, or 2) restore bits to their original sequence. During normal operation, when no skip operation has been performed, logic block 504 asserts a 1 on each select line input to MUXs 505-508, causing MUXs 505-508 to shift bits through logic 500 in the order received. However, once logic block 504 determines a skip operation has been performed on bits, it counts the number of consecutive skip operations (i.e., the number of skip signals asserted on SI[0] over sequential bit times) to determine what select line signals it should assert to cause MUXs 505-508 to reorder the bits. In such case, as will be described further, logic block 504 asserts an appropriate combination of 0, 1, and 2 signals on respective select lines, causing MUXs 505-508 to restore the bits to their original sequence. According to the illustrated embodiment, asserting a 0 on a select line causes a MUX to circulate a previously-output bit, asserting a 1 on a select line causes a MUX to shift a received bit to its output, and assurgent a 2 on a select line causes a MUX to insert a later-received bit in the bit sequence.

According to the illustrated embodiment, first MUX 505 has two inputs, 1 and 0. At its 1 input, MUX 505 receives a non-inverted bit from first XOR gate 503 at a current bit time. MUXs 506-508 also receive the non-inverted bit from first XOR gate 503 at a current bit time at their 2 input. At its 0 input, MUX 505 receives a bit via a feedback loop from its output. The value on the select line input $S_z$ causes first MUX 505 to select one of the two inputs to place at its output, where its output is presented as a 1 input to MUX 506, a destination $Ra_i$, and a 0 input to MUX 505 via the feedback loop. According to the illustrated embodiment, if the signal asserted on $S_z$ is a 1, first MUX 505 provides the bit received at its 1 input (i.e., the bit received at the current bit time) to second MUX 506, destination $Ra_i$, and back to its 0 input. In effect, the operation causes received bits to be shifted through logic 500 in the same sequence they are received. On the other hand, if the signal asserted on $S_z$ is a 0, first MUX 505 provides the bit received at its 0 input (i.e., a bit received at a previous bit time) to second MUX 506, destination $Ra_i$, and its 0 input, effectively circulating the previously-received bit within the receiver logic.

Each MUX 506-508 has three inputs, 2, 1, and 0. MUXs 506-508 receive a bit from the preceding MUX at their 1 input, a bit from first XOR gate 503 at its 2 input, and a bit from an output feedback loop at its 0 input. Similar to the previous discussion regarding MUX 505, the value on the select line inputs $S_a$, $S_b$, and $S_c$ cause a respective MUX 506-508 to select one of the three inputs to place at its output, where their output is presented as a 1 input to a following MUX, a respective destination $Rb_i$, $Rc_i$, $Rd_i$, and a 0 input to via a feedback loop. When compared to MUX 505, each MUX 506-508 additionally has a 2 input for receiving a bit from first XOR gate 503 at a current bit time. Where a value 2 is asserted on a respective select line, MUX 506-508 will present the bits received from first XOR gate 503 at its output in place of bits shifted and received from the preceding MUX or a bit received via the feedback loop.

Consider the example where a single skip operation has been performed on bits received at a current bit time, e.g., bit time i (i.e., the bits received at bit time i were transmitted out of order, being placed ahead of bits in the original bit stream). According to the embodiment illustrated at FIG. 5, a logic value 1 is asserted on SI[0] and input to logic block 504. Logic block 504 counts the number of consecutive skip operations to determine what signals it should assert to cause MUXs 505-508 to restore the received bits to their original sequence. In this example, SI[0] asserts a value 1 for only one bit time before asserting a value 0. Upon determining that a single skip operation was performed, at the immediately following bit time (bit time i+1) logic block 504 asserts a 0 on select line $S_z$, a 2 on select line $S_a$, and a 1 on the remaining select lines. As may be seen, this operation causes MUX 505 to circulate its previously output bit and MUX 506 to output the bit received from first XOR gate 503 (received at its 2 input) instead of the bit received from MUX 505. As such, the embodiment illustrated at FIG. 5 operates to move the previously skipped bits (received at logic 500 at bit time i+1) ahead of the earlier received bits (received at logic 500 at bit time i) upon assertion of a 0 on the select line to MUX 505 and assertion of a 2 on the select line input to MUX 506 following a single skip operation. Where only a single skip operation is performed, i.e., where two bits are swapped, only the first two MUXs are required to restore bits to their original sequence. However, where multiple skip operations have been performed, additional MUXs are involved in restoring the bits to their original sequence.

Consider the example where three consecutive skip operations have been performed on bits received at bit times i, i+1, and i+2 (i.e., the bits received at bit times i, i+1, and i+2 were transmitted out of order, being placed ahead of a bit in the original bit stream). A logic value 1 is asserted on SI[0] and input to logic block 504 at bit times i, i+1, and i+2. Logic block 504 counts the number of consecutive skip operations to determine what signals it should assert to cause MUXs 505-508 to restore the received bits to their original sequence. In this example, SI[0] asserts a value 1 for three bit times before asserting a value 0. Upon determining that three consecutive skip operations were performed, at the immediately following bit time (bit time i+3) logic block 504 asserts a 0 on select lines $S_z$, $S_a$, and $S_b$ and a 2 on select line $S_c$. This operation causes MUXs 505-508 to operate normally at bit times i, i+1, i+2, where the out-of-order bits are shifted from one MUX to another. However, at bit time i+3, logic block 504 determines the skip operations are complete and asserts signals causing each of MUXs 505-507 to circulate its previously output bit (i.e., to again output the bit it received at bit time i+2) and MUX 508 to output the bit received from first XOR gate 503 (received at its 2 input at bit time i+3) instead of the bit received from MUX 507. In this example, the previously skipped bit (received at logic 500 at bit time i+3) is moved ahead of the earlier received bits (received at logic 500 at bit times i, i+1, and i+2, respectively) upon assertion of a 0 on the select lines to MUXs 505-507 and assertion of a 2 on the select line input to MUX 508 following the three skip operations. Where three skip operations are performed, i.e., where three bits were placed ahead of a bit in the original bit stream, each of the four MUXs 505-508 are required to restore bits to their original sequence.

The embodiment illustrated at FIG. 5 comprises 4 MUXs, providing receiver logic 500 the ability to restore a 4-bit sequence. That is, receiver logic 500 may restore a fourth bit after three skip operations have been performed. However, other embodiments may be provided to accommodate restoring larger bit sequences. According to one embodiment, including additional MUXs, similar to MUXs 506-508, allow receiver logic 500 to restore bits to their original sequence when four, five, six, etc., skip operations have been performed on the received bits.

In some implementations, the number of consecutive skips that may be performed is constrained by the size of the column access from which the bits are read. Each column access correlates to a different address. As such, bits may be reordered and later restored to their original sequence only to the extent they are part of the same column access. Otherwise, problems are presented when trying to appropriately write the bits to their appropriate destination address. As a safeguard, a skip operation may be defeated on the last cycle of each column access by asserting an appropriate signal from the transmitter logic to the receiver logic. For example, when latching the parallel data, the transmitter logic may operate with a framing signal, which indicates the latched data is near the end of an access. In response, the transmitter logic will prepare to latch a next set of data from the next access. The transmitter logic may provide a corresponding signal to defeat any skip operation that would violate this constraint. Other embodiments may obviate this constraint by, e.g., withholding data in column accesses where data is reordered across those column accesses until their edge cells are unscrambled.

Figure 6:
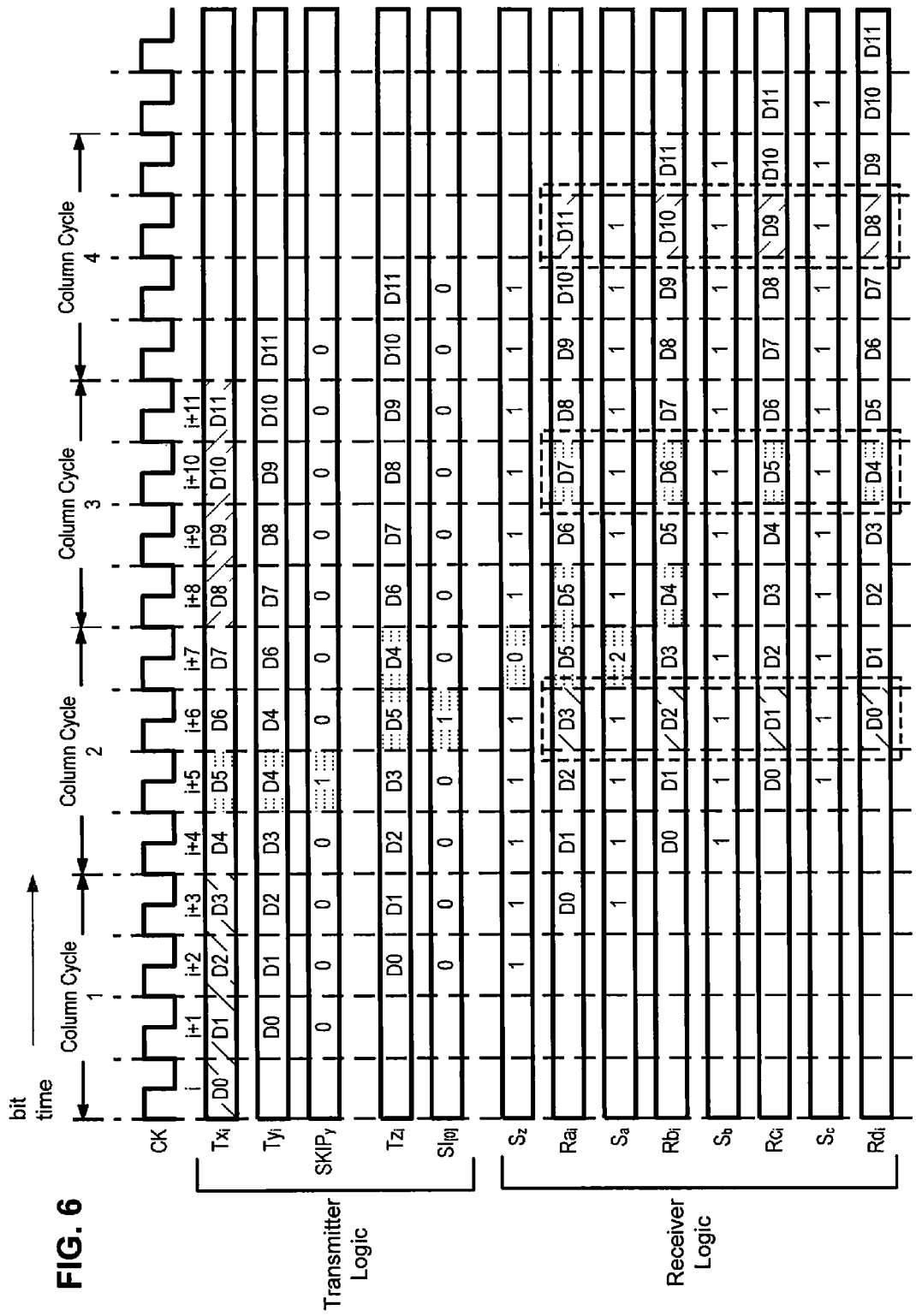
FIG. 6 is a table illustrating aspects of an embodiment.

FIG. 6 is a table that illustrates data flow between a transmitter and receiver and control signals asserted by each to reorder transmitted bits and restore received bits to their original sequence according to one implementation of the concepts described herein. The horizontal axis represents bit times, i, i+1, i+2, ..., i+n. As such, each column represents a discrete bit time and rows within each column represent data flow and signals asserted by the transmitter and receiver at each discrete bit time. Bit times are demarcated according to column cycles, which represent different column accesses at which the bits are latched.

Consistent with the terminology above, $TX_i$ represents a bit on a bit lane input to transmitter logic at a current bit time (e.g., a bit on one of bit lanes $103_i$ input to one of transmitter logic blocks 402 illustrated in FIG. 4). $TY_i$ represents a previously received bit having been clocked through the transmitter logic). $TZ_i$ represents a bit output from the transmitter logic at the current bit time. Data flow through the transmitter logic may be understood by observing that bits comprising a byte, e.g., byte D0, may be input to the transmitter logic at bit time i (represented by $TX_i$), clocked through the transmitter logic at bit time i+1 (represented by $TY_i$), and output from the transmitter logic at bit time i+2 (represented by $TZ_i$). Following, bits comprising byte D1 are provided to the transmitter logic input at bit time i+1 (represented by $TX_i$), clocked through the transmitter logic at bit time i+2 (represented by $TY_i$), and output from the transmitter logic at bit time i+3 (represented by $TZ_i$). Bits comprising bytes D2, D3, D4, and so on, sequentially follow bytes D0 and D1 and, according to FIG. 6, are represented as $TX_i$, $TY_i$, and $TZ_i$ according to their flow through the transmitter logic.

The data flow through the transmitter logic depends upon a comparison between 1) bits output from the transmitter logic, $TZ_i$, and bits having been clocked through the transmitter logic, $TY_i$, and 2) bits output from the transmitter logic, $TZ_i$, and bits input to the transmitter logic, $TX_i$. Aside from other considerations, if the transmitter logic determines that fewer bit transitions exist between $TZ_i$ and $TX_i$ than between $TZ_i$ and $TY_i$ at a given bit time, it will replace the $TY_i$ bits with the $TX_i$ bits at its output at the immediately following bit time. An implementation of logic used to perform these operations is described in greater detail with reference to the embodiment illustrated at FIG. 4.

FIG. 6 illustrates the signaling and data flow when transmitter logic performs a single skip operation. At bit times i-i+4 the transmitter logic transmits bits on each bit lane without performing a skip operation. At bit time i+5, the transmitter logic performs comparisons between 1) bits comprising byte D3 (i.e., the $TZ_i$ bits output from the transmitter logic at the current bit time) to bits comprising byte D4 (i.e., the $TY_i$ bits input to the transmitter logic at a previous bit time and clocked through the transmitter logic), and 2) bits comprising byte D3 to bits comparing byte D5 (i.e., the $TX_i$ bits input to the transmitter logic at the current bit time). In doing so, the transmitter logic determines there are more bit transitions between D3 and D4 than between D3 and D5, and as such, transmitting byte D4 immediately after byte D3 would result in more bit transitions than transmitting byte D5 immediately after byte D3. As a result, the transmitter logic asserts a logic value 1 on the $SKIP_y$ line, indicating to the transmitter logic the $TY_i$ bits should be skipped in favor of the $TX_i$ bits. This causes the transmitter logic to place byte D5 at its output in place of byte D4 during the immediately following bit time, bit time i+6. Further, the transmitter logic asserts a logic value 1 on the SI[0] line, indicating to the receiver logic that a skip operation has been performed on the bits received at bit time i+6.

At bit time i+6, byte D5 is output from the transmitter logic, byte D4 is circulated within the transmitter logic, and byte D6 is input to the transmitter logic. Consistent with the operations previously discussed, the transmitter logic compares 1) bits comprising byte D5 (i.e., the $TZ_i$ bits output from the transmitter logic at the current bit time) to bits comprising byte D4 (i.e., the $TY_i$ bits input to the transmitter logic at a previous bit time and clocked through the transmitter logic), and 2) bits comprising byte D5 to bits comparing byte D6 (i.e., the $TX_i$ bits input to the transmitter logic at the current bit time). In doing so, the transmitter logic determines that transmitting byte D4 immediately after byte D5 would require less bit transitions than transmitting byte D6 immediately after byte D5. As such, the transmitter logic asserts a logic value 0 on the $SKIP_y$ line, indicating to the transmitter logic the $TY_i$ bits should be placed at its output. This causes the transmitter logic to place byte D4 at its output during the immediate following bit time, bit time i+7. Further, the transmitter logic asserts a logic value 0 on the SI[0} line, indicating to the receiver logic that a skip operation has not been performed on the bits received at bit time i+7.

At bit time i+7, the transmitter logic compares 1) bits comprising byte D4 (the $TZ_i$ bits) to bits comprising byte D6 (the $TY_i$ bits), and 2) bits comprising byte D4 to bits comprising byte D7 (the $TX_i$ bits). The transmitter logic determines there are fewer bit transitions between D4 and D6 than between D4 and D7, and therefore, transmits D6 ahead of D7 according to their original sequence. The transmitter logic again asserts a logic value 0 on the $SKIP_y$ line, indicating to the transmitter logic the $TY_i$ bits should be placed at its output. This causes the transmitter logic to place byte D6 at its output during the immediate following bit time, bit time i+8. Further, the transmitter logic asserts a logic value 0 on the SI[0] line, indicating to the receiver logic that a skip operation has not been performed on the bits received at bit time i+8. Finally, at bit time i+8 with no skip operating having been performed during the current or previous bit times, bits are transmitted from the transmitter logic according to their original sequence.

FIG. 6 also illustrates the signaling and data flow when receiver logic performs operations to restore bits to their original sequence when a single skip operation has been performed according to the previous discussion. Bits are input to the receiver logic on bit lanes (e.g., bits received on bit lanes $103_i$ input to one of receiver logic blocks 502 illustrated in FIG. 5) where, again, each column represents a discrete bit time. Further, $S_z$, $S_a$, $S_b$, and $S_c$ represent inputs to respective receiver logic operative to restore bits to their original sequence and $Ra_i$, $Rb_i$, $Rc_i$, and $Rd_i$ represent respective destinations.

At bit time i+6 bits comprising byte D5 are input to the receiver logic on a respective bit lane. A logic value 1 is asserted on the SI[0] input to receiver logic, e.g., logic block 504 illustrated at FIG. 5, indicating the bits are received out of order. The receiver logic determines the number of consecutive skip operations by counting the number of skip signals asserted on the SI[0] line during consecutive bit times followed by a 0 signal on the SI[0] line. Once the number of consecutive skip operations is determined, the receiver logic knows what signals to assert on inputs to other receiver logic to restore the bits.

In this example, a single skip signal is asserted on the SI[0] line at bit time i+6. As such, at bit time i+7 the receiver logic asserts a 0 on select line $S_z$, a 2 on select line $S_a$, and a 1 on the remaining select lines. According to the embodiment illustrated at FIG. 5, this operation causes each MUX 505 to circulate its previously output bit (bits comprising byte D5) and each MUX 506 to output the bit received from first XOR gate 503 (bits comprising byte D4) instead of the bit received from MUX 505. This operation effectively moves the previously skipped byte, byte D4, ahead of the earlier received byte, byte D5, upon assertion of a 0 on the select line $S_z$ and assertion of a 2 on the select line $S_a$. As seen, at bit time i+8, the byte order has been restored such that bytes D2-D5 have been restored to their original sequence. Also, at bit times i+9 and thereafter, the bytes are received according to their original sequence.

Figure 7:
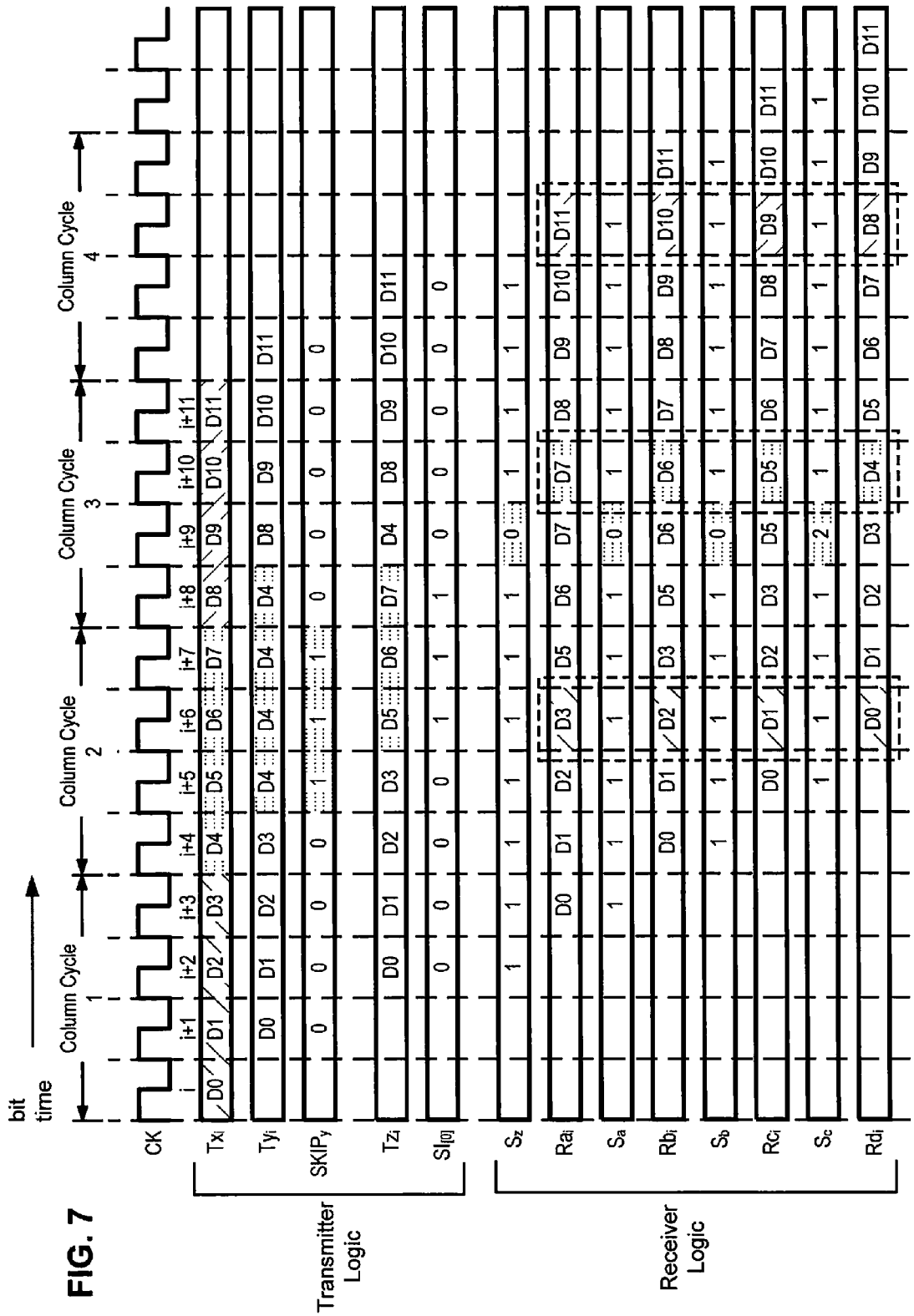
FIG. 7 is a table illustrating aspects of an embodiment.

FIG. 7 is also a table that illustrates data flow between a transmitter and receiver and control signals asserted by each to reorder transmitted bits and restore received bits to their original sequence where three skip operations are performed. FIG. 7 differs from FIG. 6 in that it illustrates an example where three skip operations are performed instead of a single skip operation.

At bit times i-i+4 the transmitter logic transmits bits on each bit lane without performing a skip operation. At bit time i+5, the transmitter logic compares 1) bits comprising byte D3 (i.e., the $TZ_i$ bits output from the transmitter logic at the current bit time) to bits comprising byte D4 (i.e., the $TY_i$ bits input to the transmitter logic at a previous bit time and clocked through the transmitter logic), and 2) bits comprising byte D3 to bits comparing byte D5 (i.e., the $TX_i$ bits input to the transmitter logic at the current bit time). The transmitter logic determines there are more bit transitions between D3 and D4 than between D3 and D5. As such, the transmitter logic asserts a logic value 1 on the $SKIP_y$ line, causing byte D5 to be output in place of byte D4 during the immediately following bit time, bit time i+6. The transmitter logic also asserts a logic value 1 on the SI[0] line, indicating to the receiver logic that a skip operation has been performed on the bits received at bit time i+6.

At bit time i+6, byte D5 is output from the transmitter logic, byte D4 is circulated within the transmitter logic, and byte D6 is input to the transmitter logic. The transmitter logic compares 1) bits comprising byte D5 (i.e., the $TZ_i$ bits output from the transmitter logic at the current bit time) to bits comprising byte D4 (i.e., the $TY_i$ bits input to the transmitter logic at a previous bit time and clocked through the transmitter logic), and 2) bits comprising byte D5 to bits comparing byte D6 (i.e., the $TX_i$ bits input to the transmitter logic at the current bit time). The transmitter logic determines there are more bit transitions between D5 and D4 than between D5 and D6. As such, the transmitter logic again asserts a logic value 1 on the $SKIP_y$ line, causing byte D6 to be output in place of byte D4 during the immediately following bit time, bit time i+7. The transmitter logic again asserts a logic value 1 on the SI[0] line, indicating to the receiver logic that a skip operation has been performed on the bits received at bit time i+7.

At bit time i+7, byte D6 is output from the transmitter logic, byte D4 is again circulated within the transmitter logic, and byte D7 is input to the transmitter logic. The transmitter logic compares 1) bits comprising byte D6 (i.e., the $TZ_i$ bits output from the transmitter logic at the current bit time) to bits comprising byte D4 (i.e., the $TY_i$ bits input to the transmitter logic at a previous bit time and clocked through the transmitter logic), and 2) bits comprising byte D6 to bits comparing byte D7 (i.e., the $TX_i$ bits input to the transmitter logic at the current bit time). The transmitter logic determines there are more bit transitions between D6 and D4 than between D6 and D7. As such, the transmitter logic again asserts a logic value 1 on the $SKIP_y$ line, causing byte D7 to be output in place of byte D4 during the immediately following bit time, bit time i+8. The transmitter logic again asserts a logic value 1 on the SI[0] line, indicating to the receiver logic that a skip operation has been performed on the bits received at bit time i+8.

At bit time i+8, byte D7 is output from the transmitter logic, byte D4 is again circulated within the transmitter logic, and byte D8 is input to the transmitter logic. The transmitter logic compares 1) bits comprising byte D7 (i.e., the $TZ_i$ bits output from the transmitter logic at the current bit time) to bits comprising byte D4 (i.e., the $TY_i$ bits input to the transmitter logic at a previous bit time and clocked through the transmitter logic), and 2) bits comprising byte D7 to bits comparing byte D8 (i.e., the $TX_i$ bits input to the transmitter logic at the current bit time). Now the transmitter logic determines that transmitting byte D4 immediately after byte D7 would require less bit transitions than transmitting byte D8 immediately after byte D4. As such, the transmitter logic asserts a logic value 0 on the $SKIP_y$ line, causing the transmitter logic to place byte D4 at its output during the immediate following bit time, bit time i+9. Further, the transmitter logic asserts a logic value 0 on the SI[0] line, indicating to the receiver logic that a skip operation has not been performed on the bits received at bit time i+9. Alternately, if byte D8 is for a separate transaction and the system does not allows skips across column cycle boundaries, byte D4 will be transmitted before byte D8 even if this results in more transitions. Finally, at bit time i+10 with no skip operations having been performed during the current or previous bit time, bits are transmitted from the transmitter logic according to their original sequence.

FIG. 7 also illustrates the signaling and data flow when receiver logic performs operations to restore bits to their original sequence when three skip operations have been performed according to the previous discussion. At bit time i+6 bits comprising byte D5 are input to the receiver logic, at bit time i+7 bits comprising byte D6 are input to the receiver logic, and at bit time i+8 bits comprising byte D7 are input to the receiver logic. During bit times i+6-i+8 a logic value 1 is asserted on the SI[0] line input to receiver logic, e.g., logic block 504 illustrated at FIG. 5, indicating the bits are received out of order.

The receiver logic determines the number of consecutive skip operations by counting the number of skip signals asserted on the SI[0] line during consecutive bit times followed by a 0 signal on the SI[0] line. Once the number of consecutive skip operations is determined, the receiver logic knows what signals to assert on inputs to other receiver logic to restore the bits. In this example, three skip signals were asserted on the SI[0] line at bit times i+6, i+7, and i+8, followed by a 0 signal at bit time i+9. According to the embodiment illustrated at FIG. 5, this operation causes MUXs 505-508 to operate normally at bit times i+6, i+7, and i+8, where the out-of-order bits are shifted from one MUX to another. However, at bit time i+9, logic block 504 determines the skip operations are complete and asserts signals causing each MUXs 505-507 to circulate the previously output bits (i.e., to output the previously received bit) and each MUX 508 to output the bit received from first XOR gate 503 (received at its 2 input) instead of the bit received from MUX 507. In this example, the previously skipped bit (received at logic 500 at bit time i+9) is moved ahead of the earlier received bits (received at logic 500 at bit times i+6, i+7, and i+8, respectively) upon assertion of a 0 on the select lines to each MUXs 505-507 and assertion of a 2 on the select line input to MUX 508 following the three skip operations. Where three skip operations are performed, i.e., where three bits were placed ahead of a bit in the original bit stream, each MUXs 505-508 are required to restore bits to their original sequence. Also, at bit times i+9 and thereafter, the bytes are received according to their original sequence.

Figure 8:
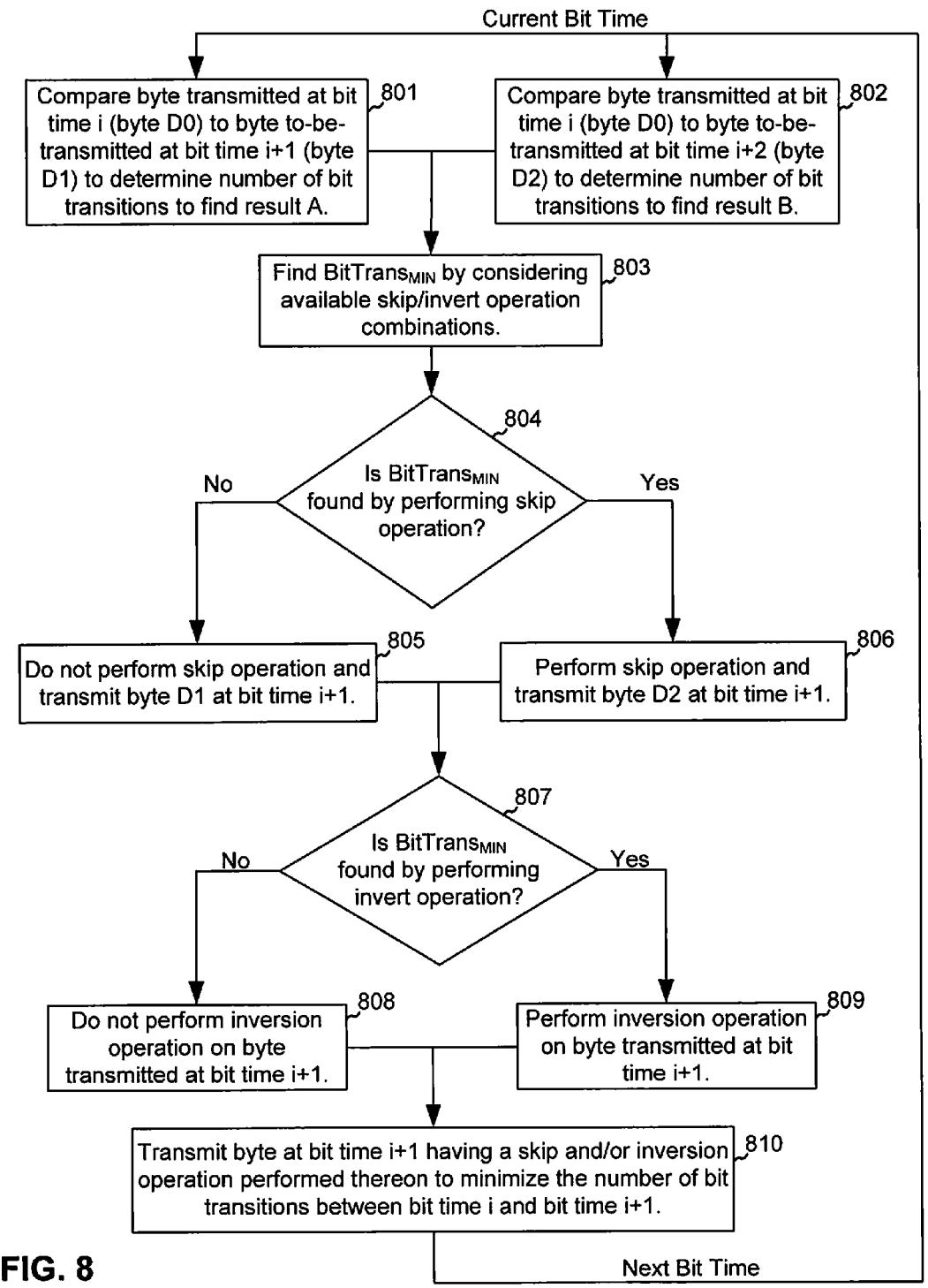
FIG. 8 is a flow chart of a process for bit transitions using conditional skipping and/or inversion operations according to an embodiment.

FIG. 8 is a flow chart for one embodiment of a method for minimizing the number of bit transitions using the skip and/or inversion operations described above. Doing so minimizes power consumption and signal noise. At step 801, a byte transmitted at bit time i (byte D0) is compared to a byte scheduled to-be-transmitted at bit time i+1 (byte D1) to determine the number of bit transitions there between. This number of bit transitions may be referred to as "result A." At step 802, byte D0 is concurrently compared to a byte scheduled to-be-transmitted at bit time i+2 (byte D2) to determine the number of bit transitions there between. This number of bit transitions may be referred to as "result B." At step 803, a minimum bit transition number, $BitTrans_{MIN}$, is determined by considering four possibilities: 1) performing a skip operation and invert operation on D1 and D2, 2) performing a skip operation only while not inverting D1 and D2, 3) not performing a skip operation while inverting D1 and D2, and 4) performing neither a skip operation nor an invert operation on D1 and D2. According to one implementation, where bytes D0, D1, and D2 comprise 8 bits and two results are found, i.e., result A and result B, $BitTrans_{MIN}$ will be one of A, B, 8-A, or 8-B. At step 804, it is determined whether a skip operation should be performed at bit time i+1 based on the determined BitTrans$_{MIN}$. At step 805, if BitTrans$_{MIN}$ is found by not performing a skip operation, then D1 is transmitted at bit time i+1. At step 806, if BitTrans$_{MIN}$ is found by performing a skip operation, then a skip operation is performed on D1, and D2 is transmitted at bit time i+1. At step 807, it is determined whether an invert operation should be performed at bit time i+1 based on the determined BitTrans$_{MIN}$. At step 808, if BitTrans$_{MIN}$ is found by not performing an invert operation on the byte transmitted at bit time i+1, then an invert operation is not performed on that byte. At step 809, if BitTrans$_{MIN}$ is found by performing an invert operation on the byte transmitted at bit time i+1, then an invert operation is performed on that byte. Finally, at step 810, a byte is transmitted at bit time i+1 having a skip and/or inversion operation performed thereon to minimize the number of bit transitions between bit time i and bit time i+1. Step 810 returns to steps 801/802 to repeat the process.

The method illustrated at FIG. 8 compares byte D0 to each of bytes D1 and D2 and applies skipping and/or inversion operations additionally or alternatively. Consider an example where byte D0 is compared to each of bytes D1 and D2. From the comparisons, it is determined that, in a non-skipped, non-inverted state, the number of bit transitions between D0 and D1 is 6 and the number of bit transitions between bytes D0 and D2 is 7. According to one implementation, no skip operation would be performed and an inversion operation would be performed on byte D1, causing a bit transition of 2 at bit time i+1. However, according to another implementation, it is recognized that, if each of bytes D1 and D2 are inverted, the number of bit transitions between bytes D0 and D1 becomes 2 and the number of bit transitions between bytes D0 and D2 is 1. Accordingly, a skip operation is performed after inverting each of bytes D1 and D2, causing a bit transition of 1 at bit time i+1. In such cases the inverted or non-inverted form of the ultimately transmitted bits may be considered for subsequent comparisons to reduce bit transitions.

As may be seen, in some instances the minimum number of total bit transitions will be achieved by applying inversion, skipping, both inversion and skipping, or neither inversion nor skipping, depending on the bit times being compared. Further, the discussion above does not consider bit transitions attributable to switching of the skip and inversion signals. However, in some embodiments, consideration may be given to the effect of changing the inversion bits and skip bits between bit times. That is, maintaining the inversion and skip bits in the same binary state between bit times would reduce the number of bit transitions on the system overall. Such may be taken into account in some embodiments to determine the most appropriate application of inversion and skipping for a given bit time.

In the foregoing description and in the accompanying drawings, specific terminology and drawing symbols are set forth to provide a thorough understanding of the concepts described herein. In some instances, the terminology and symbols may imply specific details that are acceptable, but not necessary. For example, circuits described or depicted as including metal oxide semiconductor (MOS) transistors may alternatively be implemented using bipolar technology or any other technology in which a signal-controlled current flow may be achieved.

A method for performing skip and or inversion operations to minimize bit transitions in accordance with embodiments described herein can be implemented as, e.g., code in software, hardware, or a combination thereof. For example, when implemented in a computer-readable medium, the computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein. In any event, the logic described above can be implemented in hardware, software, or a combination thereof.

While specific embodiments have been described, certain variations flow from those specific embodiments. For example, any unidirectional, point-to-point, or chip-to-chip embodiments described herein are easily extensible to bidirectional systems, multi-drop buses, and to communication within and between larger or smaller systems. Furthermore, the advantages provided by the circuitry, logic, and hardware depicted above can be extended to other types of signals. For example, continuous-time clock signals conveyed in parallel on an integrated circuit can suffer from signal switching noise and may benefit from the solutions provided herein. In still other embodiments the transmitted signals can be multi-pulse-amplitude-modulated (multi-PAM) signals.

Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description.

The invention claimed is:

1. A method for operating a transmitter, said method comprising:
    selecting, for a plurality of multi-bit data symbols to be transmitted over a parallel bus coupled to a receiver, one of a plurality of transmission orderings of the data symbols; and
    transmitting said plurality of data symbols over the parallel bus to the receiver according to said selected transmission ordering, each of the data symbols transmitted at a different respective time according to the selected transmission ordering, and transmitting information identifying said selected transmission ordering to the receiver.

2. The method of claim 1 wherein said multi-bit symbols are transmitted in a selected one of an inverted form or a non-inverted form.

3. The method of claim 1 wherein said selecting said transmission ordering is performed to minimize bit transitions between adjacent transmitted data symbols.

4. The method of claim 1 wherein transmitting according to said selected transmission ordering comprises transmitting a second data symbol instead of a first data symbol during a first bit time.

5. The method of claim 2 wherein selecting one of an inverted form comprises inverting the value of one or more of said data symbols to reduce a number of bit transitions.

6. The method of claim 4 wherein transmitting according to said selected transmission ordering further comprises transmitting a third data symbol instead of a first data symbol during a second bit time.

7. A data transmitter comprising:
a selection circuit to select, for a plurality of multi-bit data symbols to-be-transmitted in order over a parallel bus coupled to a receiver, one of a plurality of transmission orderings of the data symbols;
a reorder circuit to queue said data symbols for transmission according to said selected transmission ordering; and
a transmitter circuit to transmit said data symbols from said reorder logic over the parallel bus to a receiver, each of the data symbols transmitted at a different respective time according to the selected transmission ordering, and to transmit information identifying said selected transmission ordering to the receiver.

8. The transmitter of claim 7 further comprising:
an inversion circuit to invert said data symbols for transmission according to an inverted form or a non-inverted form.

9. The transmitter of claim 7 wherein said selection circuit minimizes bit transitions between adjacent transmitted data symbols.

10. The transmitter of claim 7 wherein said reorder circuit queues a second data symbol for transmission instead of a first data symbol during a first bit time.

11. The transmitter of claim 8 wherein said inversion circuit inverts the value of one or more of said data symbols to reduce a number of bit transitions.

12. The transmitter of claim 10 wherein said reorder circuit queues a third data symbol for transmission instead of a first data symbol during a second bit time.

13. A non-transitory computer-readable medium having stored thereon instructions that, when executed, direct a transmitter to:
select, for a plurality of multi-bit data symbols to be transmitted over a parallel bus coupled to a receiver, one of a plurality of transmission orderings; and
transmit said plurality of data symbols over the parallel bus to the receiver according to said selected transmission ordering, each of the data symbols transmitted at a different respective time according to the selected transmission ordering, and transmit information identifying said selected transmission ordering to the receiver.

14. The non-transitory computer-readable medium of claim 13 having stored thereon instructions that, when executed, further direct a transmitter to transmit said multi-bit symbols in a selected one of an inverted form or a non-inverted form.

15. The non-transitory computer-readable medium of claim 13 having stored thereon instructions that, when executed, further direct a transmitter to minimize bit transitions between adjacent transmitted data symbols.

16. The non-transitory computer-readable medium of claim 13 having stored thereon instructions that, when executed, further direct a transmitter to transmit a second data symbol instead of a first data symbol during a first bit time.

17. The non-transitory computer-readable medium of claim 14 having stored thereon instructions that, when executed, further direct a transmitter to invert the value of one or more of said data symbols to reduce a number of bit transitions.

18. A method for operating a receiver, said method comprising:
receiving a plurality of multi-bit data symbols via a parallel bus coupled to the receiver, said data symbols transmitted in order over the parallel bus according to one of a plurality of transmission orderings, each of the data symbols received at a different respective time, and receiving information identifying said selected transmission ordering; and
based on said identifying information, restoring said received plurality of data symbols to an original ordering by:
delaying data received from first column accesses; and
reordering said data received from said first column accesses with data received from second column accesses by unscrambling respective edge cells of each.

19. The method of claim 18 further comprising:
determining whether said data symbols are in a non-inverted or inverted form; and
if said data symbols are in an inverted form, recovering a non-inverted form of said data symbols.

20. The method of claim 18 wherein restoring said received plurality of data symbols to an original ordering comprises inserting a later received data symbol ahead of an earlier received data symbol.

21. The method of claim 18 wherein restoring said received plurality of data symbols to an original ordering comprises inserting a later received data symbol ahead of a plurality of earlier received data symbols.

22. A data receiver comprising:
a receive circuit to receive a plurality of multi-bit data symbols via a parallel bus coupled to the receiver, the data symbols transmitted according to one of a plurality of transmission orderings, each of the data symbols received at a different respective time, and the receive circuit to receive information identifying said selected transmission ordering; and
a restore circuit to, based on said identifying information, restore said received plurality of data symbols to an original ordering by data received from first column accesses and reordering said data received from said first column accesses with data received from second column accesses by unscrambling respective edge cells of each.

23. The data receiver of claim 22 further comprising:
a non-invert circuit to determine said data symbols are in a non-inverted or inverted form and recover a non-inverted form of inverted data symbols.

24. The data receiver of claim 22 wherein said restore circuit inserts a later received data symbol ahead of an earlier received data symbol.

25. The data receiver of claim 22 wherein said restore circuit inserts a later received data symbol ahead of an earlier received data symbol.

26. A non-transitory computer-readable medium having stored thereon instructions that, when executed, direct a receiver to:
receive a plurality of multi-bit data symbols via a parallel bus coupled to the receiver, said data symbols transmitted according to one of a plurality of transmission orderings, each of the data symbols transmitted at a different respective time, and receiving information identifying said selected transmission ordering; and based on said identifying information, restore said received plurality of data symbols to an original ordering by:
  delaying data received from first column accesses; and
  reordering said data received from said first column accesses with data received from second column accesses by unscrambling respective edge cells of each.

27. The non-transitory computer-readable medium of claim 26 having stored thereon instructions that, when executed, further direct a receiver to:
  determine whether said data symbols are in a non-inverted or inverted form; and
  if said data symbols are in an inverted form, recover a non-inverted form of said data symbols.

28. The non-transitory computer-readable medium of claim 26 having stored thereon instructions that, when executed, further direct a receiver to insert a later received data symbol ahead of an earlier received data symbol.

29. The non-transitory computer-readable medium of claim 26 having stored thereon instructions that, when executed, further direct a receiver to insert a later received data symbol ahead of a plurality of earlier received data symbols.

30. A method for minimizing the number of bit transitions in a communication system, said method comprising:
  determining a number of bit transitions required to transmit a plurality of data symbols according to a first sequence of the data symbols;
  reordering said plurality of data symbols to form a second sequence of the data symbols based on the number of bit transitions, said second sequence requiring fewer bit transitions than said first sequence; and
  transmitting said plurality of data symbols according to said second sequence, each of the plurality of data symbols transmitted at a different respective time according to the second sequence.

31. The method of claim 30 further comprising:
  inverting at least one of said plurality of data symbols; and
  transmitting said inverted data symbol according to said second sequence.

32. The method of claim 30 wherein determining a number of bit transitions comprises:
  comparing a transmitted data symbol to a first to-be-transmitted data symbol.

33. The method of claim 30 wherein reordering said plurality of data symbols to form the second sequence comprises inserting a second to-be-transmitted data symbol ahead of a first to-be-transmitted data symbol.

34. The method of claim 30 wherein reordering said plurality of data symbols to form the second sequence comprises inserting a second to-be-transmitted data symbol ahead of a plurality of to-be-transmitted data symbols.

* * * * *